United States Patent
Bhargav et al.

(10) Patent No.: US 10,025,481 B2
(45) Date of Patent: Jul. 17, 2018

(54) CELL VIEW MODE FOR OUTSIZED CELLS

(71) Applicant: Microsoft Technology Licensing, LLC, Redmond, WA (US)

(72) Inventors: Rajat Bhargav, Davis, CA (US); Pankaj Jain, Hyderabad (IN); Mitushi Jain, Maharashtra (IN); Abhijit Kumar Bairagi, Andhra Pradesh (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 375 days.

(21) Appl. No.: 14/875,118

(22) Filed: Oct. 5, 2015

(65) Prior Publication Data

US 2016/0188187 A1    Jun. 30, 2016

Related U.S. Application Data

(63) Continuation of application No. 13/600,310, filed on Aug. 31, 2012, now Pat. No. 9,152,618.

(51) Int. Cl.
*G06F 17/00*       (2006.01)
*G06F 3/0484*     (2013.01)
*G06F 17/24*       (2006.01)
*G06F 3/0481*     (2013.01)
*G06F 3/0485*     (2013.01)

(52) U.S. Cl.
CPC ........ *G06F 3/04847* (2013.01); *G06F 3/0481* (2013.01); *G06F 3/0485* (2013.01); *G06F 17/246* (2013.01)

(58) Field of Classification Search
CPC ...................................................... G06F 17/246
See application file for complete search history.

(56) References Cited

U.S. PATENT DOCUMENTS

| 5,253,362 | A | * | 10/1993 | Nolan .................... G06F 17/241 |
| 5,317,686 | A | * | 5/1994 | Salas ...................... G06F 17/246 715/212 |
| 5,880,742 | A | | 3/1999 | Rao et al. |
| 6,104,325 | A | * | 8/2000 | Liaw ...................... G06F 3/0481 341/50 |
| 6,317,750 | B1 | | 11/2001 | Tortolani et al. |
| 7,016,704 | B2 | * | 3/2006 | Pallakoff ................... G06F 3/14 455/419 |
| 7,165,264 | B1 | | 1/2007 | Westrick |
| 7,415,664 | B2 | | 8/2008 | Aureglia et al. |

(Continued)

OTHER PUBLICATIONS

"Tips for using Excel on your Smartphone", Published on: May 2009, Available at: http://h30458.wwww3.hp.com/ww/en/ent/798529.html.

(Continued)

*Primary Examiner* — Laurie A Ries

(57) ABSTRACT

Embodiments provide electronic spreadsheet viewing and interaction features and functionalities, but the embodiments are not so limited. In an embodiment, a computer-implemented method can be configured to provide a cell view launch indicator or interface that alerts a user that a selected cell includes additional content not being currently displayed. The cell view launch indicator can be activated and use a cell view mode to launch a separately controllable cell view window or portion. Other embodiments are included.

20 Claims, 7 Drawing Sheets

(56) References Cited

U.S. PATENT DOCUMENTS

| | | | |
|---|---|---|---|
| 7,590,944 B2* | 9/2009 | Weber | G06F 17/246 715/212 |
| 7,681,117 B2 | 3/2010 | Toigu et al. | |
| 7,890,858 B1* | 2/2011 | Graham | G06F 17/30905 715/200 |
| 7,890,882 B1* | 2/2011 | Nelson | G06F 3/0481 715/788 |
| 8,166,385 B2 | 4/2012 | Garcia-Mohna et al. | |
| 8,296,646 B2 | 10/2012 | Weitzman et al. | |
| 9,152,618 B2 | 10/2015 | Bhargav et al. | |
| 2003/0140044 A1* | 7/2003 | Mok | G06Q 50/22 |
| 2005/0097447 A1* | 5/2005 | Serra | G06F 17/246 715/213 |
| 2005/0273695 A1* | 12/2005 | Schnurr | H04W 24/00 715/213 |
| 2006/0104276 A1 | 5/2006 | Naick et al. | |
| 2006/0174212 A1* | 8/2006 | Cok | G06F 3/04855 715/786 |
| 2006/0224947 A1* | 10/2006 | Weber | G06F 17/246 715/210 |
| 2007/0050697 A1 | 3/2007 | Lewis-Bowen et al. | |
| 2007/0208992 A1* | 9/2007 | Koren | G06Q 10/10 715/212 |
| 2007/0226647 A1* | 9/2007 | Louch | G06F 9/4443 715/788 |
| 2008/0276194 A1 | 11/2008 | Dykstra-Erickson et al. | |
| 2010/0122161 A1 | 5/2010 | Jardine-Skinner et al. | |
| 2010/0199161 A1* | 8/2010 | Aureglia | G06F 17/246 715/218 |
| 2011/0107196 A1 | 5/2011 | Foster | |
| 2011/0252300 A1 | 10/2011 | Lloyd et al. | |
| 2012/0089914 A1 | 4/2012 | Holt et al. | |
| 2013/0031208 A1* | 1/2013 | Linton | G09B 7/02 709/217 |

OTHER PUBLICATIONS

"OfficeSuite Spreadsheet Pro", Retrieved on: Jun. 28, 2012, Available at: http://mobisystems.com/toc_pro/Spreadsheet_Pro.html.

"iPodtouch", Retrieved on: Jun. 28, 2012, Available at: http://www.apple.com/ipodtouch/from-the-app-store/apps-by-apple/numbers.html.

"Display cell contents via tooltip", Retrieved on: Jun. 28, 2012, Available at: http://www.mrexcel.com/forum/showthread.php?520326-display-cell-contents-via-tooltip.

U.S. Appl. No. 13/600,310, Office Action dated Dec. 29, 2014, 15 pgs.

U.S. Appl. No. 13/600,310, Amendment and Response filed Mar. 30, 2015, 9 pgs.

U.S. Appl. No. 13/600,310, Notice of Allowance dated May 28, 2015, 5 pgs.

Pettit, Linda, "PalmAddicts: SheetsToGo", Apr. 11, 2008. Available at: http://palmaddict.typepad.com/palmaddicts/2008/04/sheetstogo.html, 1 page.

Rubash, AR, et al., "Financial Modeling with Quantrix vs. Excel," Academy of Business Education, 2005, pp. 1-16.

Numbers of iOS Spreadsheets have never brought so much to the table, https://www.apple.com/ios/numbers, 9 pages (Copyright 2014).

PCT International Search Report & Written Opinion for PCT Patent Application No. PCT/US2013/056695, dated Feb. 17, 2014, Filed Date: Aug. 27, 2013, 11 pgs.

Ananoymous: "Javascript—Detect if Text-overflow. Ellipsis is Active on Input Field", Apr. 18, 2012, Available at: http://stackoverflow.com/questions/ 10209831/detect-if-text-overflowellipsis-is-active-on-input-field, 2 pgs.

"Using Ellipsis with HTML and CSS", Dec. 5, 2009, Available at: http://www.electrictoolbox.com/ellipsis-html-css/, 3 pgs.

* cited by examiner

CELL VIEW MODE FOR OUTSIZED CELLS

CROSS-REFERENCE TO RELATED APPLICATIONS

This application is a continuation of U.S. patent application Ser. No. 13/600,310, now U.S. Pat. No. 9,152,618, filed Aug. 31, 2012, entitled "Cell View Mode for Outsized Cells", which application is incorporated herein by reference.

BACKGROUND

Mobile computing devices, including smartphones, slates, tablets, etc. enable users to take their productivity to new levels by allowing users to work without being constrained to any particular physical location (e.g., assuming operating communication infrastructure). However, due in part to the form factor of handheld computing/communication devices, applications may not function in the same manner as compared to computing devices with larger screen areas (e.g., desktop, laptop, etc.). For example, viewing spreadsheets on a smartphone or slate has to accommodate some of the same issues presented by web pages and other text/content heavy documents due in part to the physically limited screen viewing area of the device.

Zooming and panning paradigms for smartphones do enable users to adjust an amount of content, such as text, in view at a particular time. However, zooming and panning operations may be inadequate in cases where a cell of a spreadsheet is too large or heavily populated. Features such as resizing rows and columns may conflict with other document formatting or be too cumbersome for viewing a limited number of cells. One exemplary use case involves the use of 'Description' or 'Comment' spreadsheet columns that may typically include large amounts of textual input and/or wide columns and/or tall rows. Providing an appealing spreadsheet viewing and interaction experience for mobile computing devices can be challenging to application and device developers.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments provide electronic spreadsheet viewing and interaction features and functionalities, but the embodiments are not so limited. In an embodiment, a computer-implemented method can be configured to provide a cell view launch indicator or interface that alerts a user that a selected cell includes additional content not being currently displayed. The cell view launch indicator can be activated and use a cell view mode to launch a separately controllable cell view window or portion. Other embodiments are included.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Figure 1:
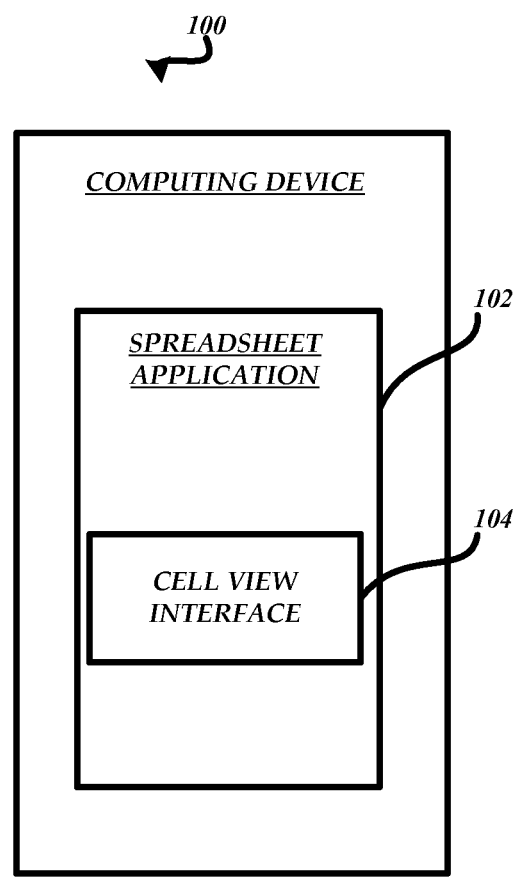
FIG. 1 is a block diagram of an exemplary portable or mobile computing/communication device.

FIG. 1 is a block diagram of an exemplary portable or mobile computing/communication device 100 (hereinafter device 100), such as a smartphone, slate computer, or tablet computer for example, that can be configured with enhanced spreadsheet viewing and/or interaction features and capabilities, but is not so limited. As shown in the exemplary simplified device depiction of FIG. 1, the device 100 includes a spreadsheet application 102 having a cell view interface module 104 that can be used to provide a selected cell view mode and/or associated interface. For example, a user can use the spreadsheet application 102 and cell view interface module or component 104 to view cell content of a selected cell in a dedicated window or view area in conjunction with a spreadsheet view being displayed in an adjoining, bifurcated, and/or other dedicated window or display portion.

It will be appreciated that the device 100 includes other components including hardware and software features (e.g., processor(s), memory, operating system (O/S), etc.) that provide useful functional features of the device 100. Moreover, embodiments of the cell view functionality can be included as part of a desktop, laptop, handheld, tablet, slate, or other type of computing or communication device/system. The spreadsheet application 102 and cell view interface module 104 can be configured as components of a computer program that includes computer-executable instructions to be executed by processing functionality of the device 100 to provide the cell view mode functionality. Generally, program modules include computer-executable instructions that use routines, programs, objects, components, data structures, etc. to perform particular tasks, operations, and/or provide various tangible operational functionalities.

As described below, the cell view interface module 104 of an embodiment can be configured with a cell view mode algorithm that operates in part to display a cell view display portion in conjunction with a spreadsheet view. The cell view mode algorithm of an embodiment is used to determine whether a selected cell includes clipped, hidden, or otherwise occluded text and/or evaluate a cell dimension or parameter with a viewable screen or display dimension or parameter. Based in part on the determination outcome, the cell view interface module 104 can be configured to provide or display a cell view launch indicator for a selected cell of the spreadsheet view. Once the cell view launch indicator is actuated (e.g., tapped, clicked, etc.), the cell view interface module 104 uses a cell view mode to bifurcate or otherwise configure the viewable screen or display area into two windows or display portions, but is not so limited. When actuated, the cell view mode of one embodiment operates to display the cell content of a selected cell in a first independently controllable (e.g., independently scrollable) window or cell view display portion in conjunction with a spreadsheet view in a second independently controllable window.

As described above, embodiments can be implemented using a portable or mobile computing device such as a smartphone, a tablet personal computer, a laptop computer, and the like. A mobile or portable computing device comprises a handheld computer having both input, output, and/or communication functionalities. Input features may include a touch screen display and/or input buttons or other tactile and/or voice activated controls that enable a user to enter information as is well known in the art. Optional input controls may include a rotary switch, button, microphone, or other type of manual input control, including a keypad for example. A keypad can be configured as a physical keypad and/or a soft keypad generated on a touch screen display.

Mobile computing device incorporates output features, such as a device display comprising a graphical user interface (GUI), a speaker(s), LED light(s), etc. Additionally, a mobile computing device may incorporate a vibration or haptic module that operates to vibrate and notify the user of something. A mobile computing device may incorporate a headphone jack for providing another means of providing output signals. An exemplary mobile computing device comprises a smart phone that can execute one or more applications similar to those of a desktop or notebook computer such as, for example, browser, e-mail, scheduling, instant messaging, media player, word processing, spreadsheet, and other applications. Some embodiments may be integrated as a computing device, such as an integrated personal digital assistant (PDA) and wireless phoneme.

As is known in the art, one or more application programs may be loaded into memory and run on or in association with an operating system and processing components. Examples of application programs include dialer programs, e-mail programs, PIM (personal information management) programs, word processing programs, spreadsheet programs, Internet browser programs, messaging programs, etc. The mobile computing device also includes non-volatile storage. Non-volatile storage may be used to store persistent information.

Applications may use and store information in non-volatile storage, such as e-mail or other messages used by an e-mail application, and the like. A synchronization application may be used to interact with a corresponding synchronization application resident on a host computer to keep the information stored in non-volatile storage synchronized with corresponding information stored at the host computer. Mobile computing device includes a power supply, which may be implemented as one or more batteries. Power supply might further include an external power source, such as an AC adapter or a powered docking cradle that supplements or recharges the batteries.

The mobile computing device may also include a radio or transceiver that operates to transmit and receive radio frequency communications. Radio facilitates wireless connectivity via a communications carrier or service provider. Transmissions to and from radio may be conducted under control of an operating system. In other words, communications received by radio may be disseminated to application programs using the operating system, and vice versa. According to another embodiment, the operating system can be an optional component and operations may be performed without the use thereof.

The radio functionality also facilitates communication with other computing devices, such as over a network. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and/or communication media.

A mobile computing device may have additional features or functionality. For example, the device may also include additional data storage devices (removable and/or non-removable) such as, magnetic disks, optical disks, or tape. Computer storage media may include volatile and nonvolatile, removable and non-removable media implemented in any method or technology for storage of information, such as computer readable instructions, data structures, program modules, or other data. Data/information generated or captured by the mobile computing device may be stored locally, or stored on any number of storage media that may be accessed by the device via the radio or via a wired connection to a separate computing device, such as a server computer in a distributed computing network such as the Internet.

As described above, embodiments can be implemented with any number of computer systems, such as in desktop environments, laptop or notebook computer systems, multiprocessor systems, micro-processor based or programmable consumer electronics, network PCs, mini computers, main frame computers and the like. Embodiments may also be practiced in distributed computing environments where tasks are performed by remote processing devices that are linked through a communications network in a distributed computing environment; programs may be located in both local and remote memory storage devices.

Figure 2:
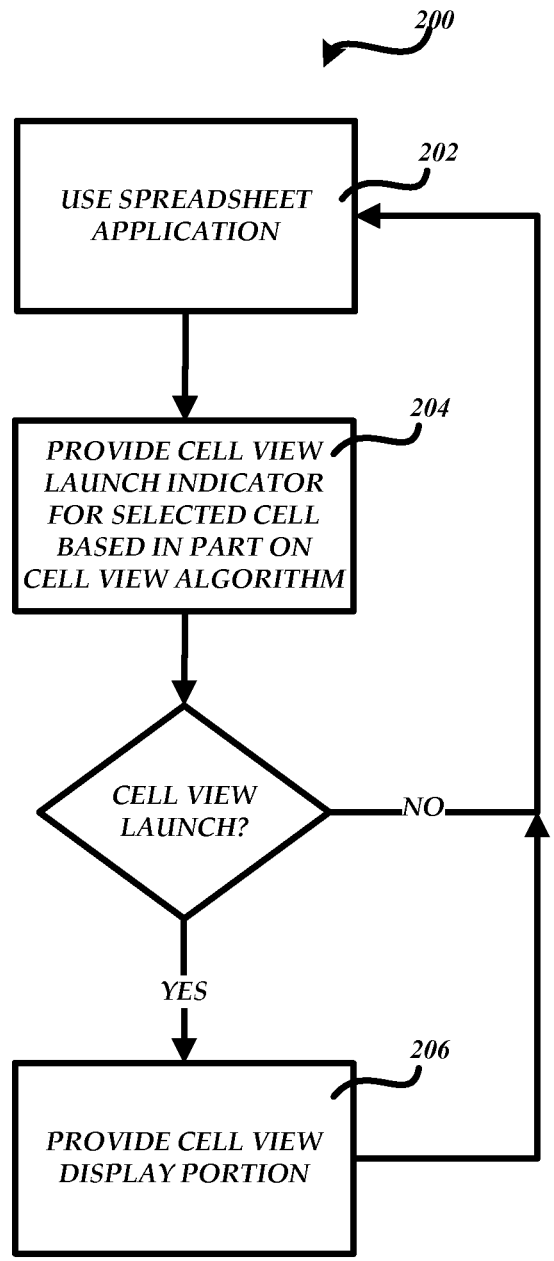
FIG. 2 is a flow diagram depicting an exemplary process of providing enhanced spreadsheet viewing and/or interaction features and functionality.

FIG. 2 is a flow diagram depicting an exemplary process 200 of providing enhanced spreadsheet viewing and/or interaction features and functionality, but is not so limited. In an embodiment, the process 200 can be encoded using complex programming as part of providing spreadsheet application features for use with a portable computing/communication device. The process 200 of an embodiment begins at 202 when a user uses a spreadsheet application to view and interact with an electronic spreadsheet or document. For example, a user can use a smartphone with an installed spreadsheet application to open and interact with a spreadsheet that has a plurality of grid cells. In another embodiment, a user can use a web-based application to interact with a particular spreadsheet. According to the particular portable electronic device in use, a user can use a variety of input modalities to interact with aspects of a displayed spreadsheet (e.g., vocal, mouse, pen/stylus, touchscreen, keys, etc.).

At 204, the process 200 of an embodiment operates to provide a cell view launch indicator (see FIGS. 4A and 4B for example) for a selected cell of the open spreadsheet being displayed on the device display based in part on an algorithmic evaluation of aspects of the selected cell. In an embodiment, the process 200 uses a cell view mode algorithm to determine whether to display the cell view launch indicator for a selected cell.

The cell view mode algorithm of an embodiment operates to trigger the display of the cell view launch indicator when the selected cell includes clipped or otherwise hidden text and/or if a cell dimension is greater than a display or screen dimension. For example, the cell view mode algorithm can be used to evaluate content of a selected cell and display the cell view launch indicator if the content has been clipped before being displayed. As another example, the cell view mode algorithm can be used to compare one or more dimensions of a selected cell with one or more dimensions of a device display or viewable or other area to determine whether to display the cell view launch indicator in or in association with (e.g., floating button) the selected cell.

In one embodiment, the cell view mode algorithm can be configured to compare a horizontal and/or vertical cell dimension to a horizontal and/or vertical screen dimension as part of determining whether to provide the cell view launch indicator. The cell view mode algorithm can use information provided by an operating system or other component as part of a dimensional comparison or other comparison or determination operation. As such, the cell view mode algorithm can be configured to account for current view settings/operations including zoom and/or pan settings/operations.

At 206, the process 200 operates to provide a cell view display portion that encompasses a portion of the device display to display content of the selected cell, such as entered textual information for example. The process 200 at 206 of an embodiment is configured to provide the cell view display portion as a separate window or view adjacently disposed to a spreadsheet view. The cell view display portion can be configured to be independently controllable so that a user can scroll about displayed content without affecting the layout of the spreadsheet view.

It will be appreciated that the spreadsheet view may be automatically resized to maintain cells in view on the device display once a user interacts with the cell view launch indicator to activate the cell view display portion for the selected cell. In another embodiment, the cell view display portion can be configured to surface temporarily in a docked position or other location (e.g., floating) as a user hovers over a cell view launch indicator of an associated selected cell. The user can exit and remove the cell view display portion by pressing a back button or other exiting mechanism. While a certain number and order of operations is described for the exemplary flow of FIG. 2, it will be appreciated that other numbers and/or orders can be used according to desired implementations.

Figure 3:
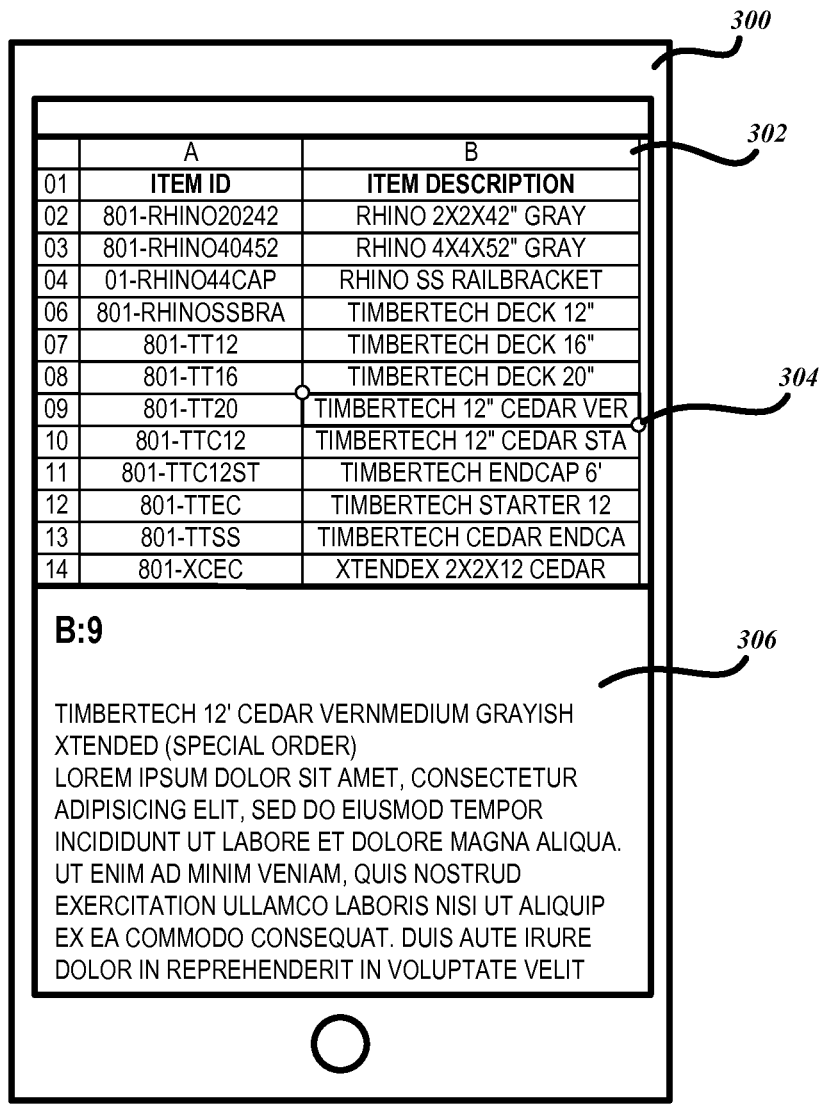
FIG. 3 depicts an exemplary portable electronic device that includes a bifurcated or partitioned display.

FIG. 3 depicts an exemplary portable electronic device 300 that includes a bifurcated or partitioned display after a user has selected (e.g., tapped, clicked, etc.) a cell view launch indicator associated with selected cell B:9. As shown in the example of FIG. 3, cells of the spreadsheet are shown in a first window or display portion 302 that includes the selected cell 304 and content of the selected cell 304 is shown in a second window or display portion 306.

In an embodiment, the first display portion 302 and second display portion 306 are independently controllable and resizable. For example, each display portion can receive resizing and other control inputs which operate to only affect the associated display portion. However, in accordance with an embodiment, if the user selects another cell which satisfies criteria for surfacing an associated cell view launch indicator, the associated content of the newly selected cell can be automatically displayed in the second display portion 306. In another embodiment, the second display portion 306 can be removed from the device display until a user affirmatively activates an associated cell view launch indicator of a newly selected cell that satisfies the cell view mode algorithm.

As described above, the cell view launch indicator can be configured to surface for an associated selected cell based in part on an evaluation of aspects of the selected cell, such as clipped content and/or cell dimensional comparisons, but is not so limited. Accordingly, the cell view launch indicator can be used to provide a persistent mode for viewing content, such as text for example, in cells without changing the layout of an associated spreadsheet. For example, once a user activates the cell view launch indicator (e.g., taps the cell view launch indicator), a cell viewing artifact can be configured as a separate and distinct scrollable window that shows the text in the cell that is independent of the size and position of the cell being shown in the spreadsheet view.

A separate and distinct cell view window can be configured to display cell text of cells being clipped in the spreadsheet view due, for example, to adjoining cells and/or improperly sized cells. The separate and distinct scrollable window enables users to view large amounts of text without having to resize the spreadsheet view or pan over a particular cell to read the associated text. Once in a persistent cell view mode, a user can use natural gestures (e.g., tapping on another cell) to view the associated content in the scrollable window. The scrollable or otherwise controllable or editable cell view window may be docked (as shown in FIG. 3) or configured to float about the device display in order to minimize overlap of displayed content.

Figures 4A, 4B:
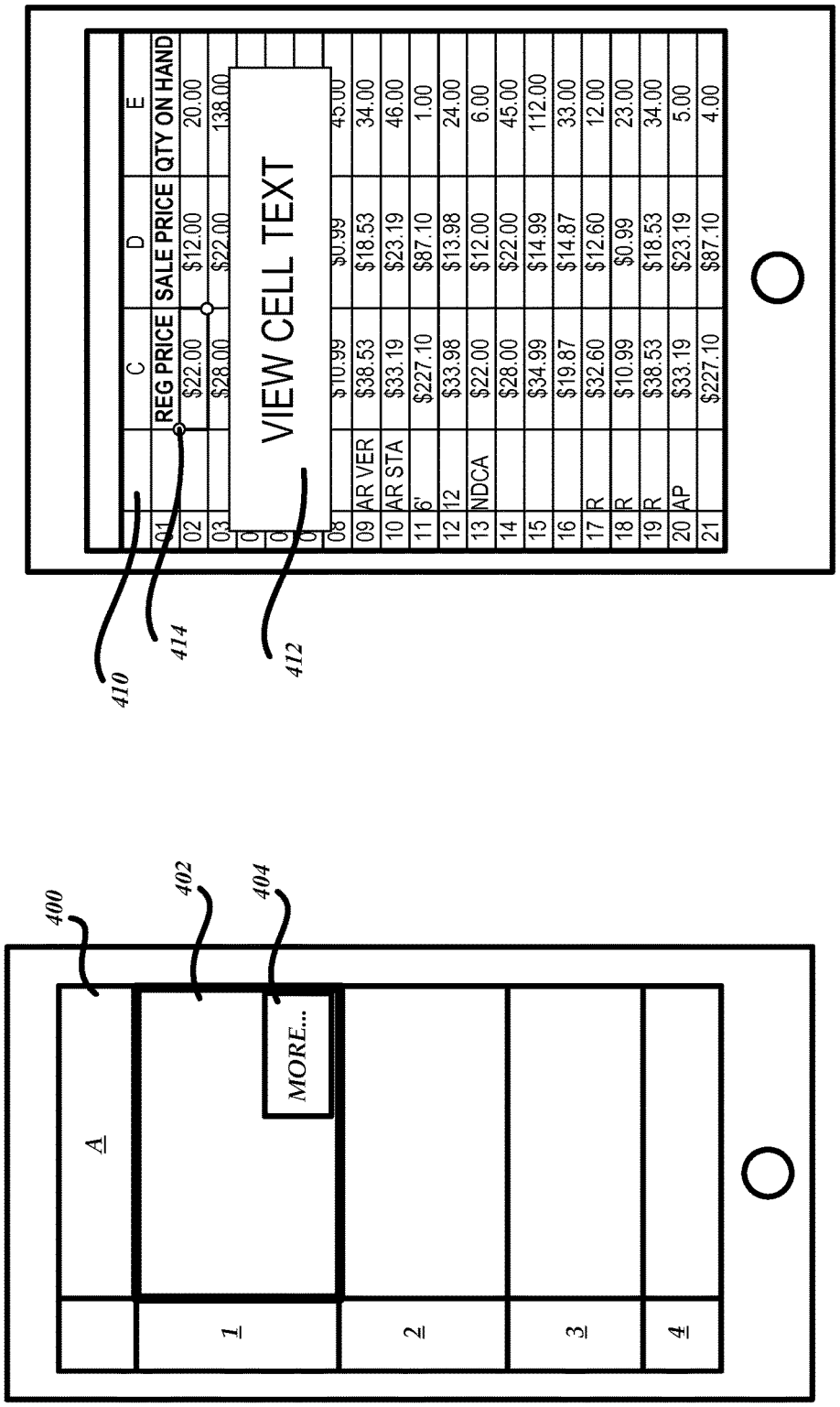
FIGS. 4A and 4B depict cell implementation examples of cell view launch indicators that can be used to alert a user to an oversized cell and/or text overflow condition.

FIGS. 4A and 4B depict implementation examples of cell view launch indicators that can be used to alert a user to an oversized cell and/or text overflow condition. The cell view launch indicator can be used to alert the user that a selected cell includes content that is not being displayed in a spreadsheet view.

FIG. 4A is an enlarged view of a portion of an example spreadsheet 400 that includes a number of cells. It will be appreciated that some spreadsheets include many numbers of cells, making it unwieldy for a user to view and interact with a significant portion of the spreadsheet. For the example implementation of FIG. 4A, a cell view launch indicator or content overflow indicator 404 has been displayed for the selected cell 402 based in part on an output of a cell view mode algorithm.

As an example, the cell view launch indicator 402 can be displayed if a cell view mode algorithm determines that the selected cell 402 includes clipped content or otherwise occluded or shortened content and/or satisfies a cell dimension to screen dimension relationship or comparative determination. For example, a cell view launch indicator 402 can be automatically displayed when a horizontal cell dimension is greater than or equal to a horizontal screen dimension (see FIG. 5). The context aware cell view launch indicator 402 can be actuated to enter a persistent cell view mode for a selected cell without having to rely on prior knowledge of context menus in order to locate and use the cell view display feature.

FIG. 4B depicts an example spreadsheet 410 that includes a number of cells being displayed on a screen of a portable electronic device, such as a smartphone or tablet touchscreen for example. As described above, users often use spreadsheets that include large numbers of cells arranged in multiple columns and rows, making it unwieldy for a user to view and interact with a significant portion of the spreadsheet when using a limited screen or display size. Moreover, the limited real estate of a device display can result in limited interaction/viewing of a small portion of the full spreadsheet or some portion thereof. For the example implementation of FIG. 4B, a cell view launch indicator 412 has been displayed for the selected cell 414 based in part on an output of a cell view mode algorithm.

The cell view launch indicator 412 can be surfaced in a floating mode such that the selected cell 414 is simultaneously in view. For example, the cell view launch indicator 412 can be displayed if a cell view mode algorithm determines that the selected cell 414 includes additional text but is not being displayed due in part to limited amounts of screen space. The exemplary context aware cell view launch indicator 412 can also be used to enter a persistent cell view mode for the selected cell 414 without having to rely on prior knowledge of a menu location to activate the cell view display feature.

Figure 5:
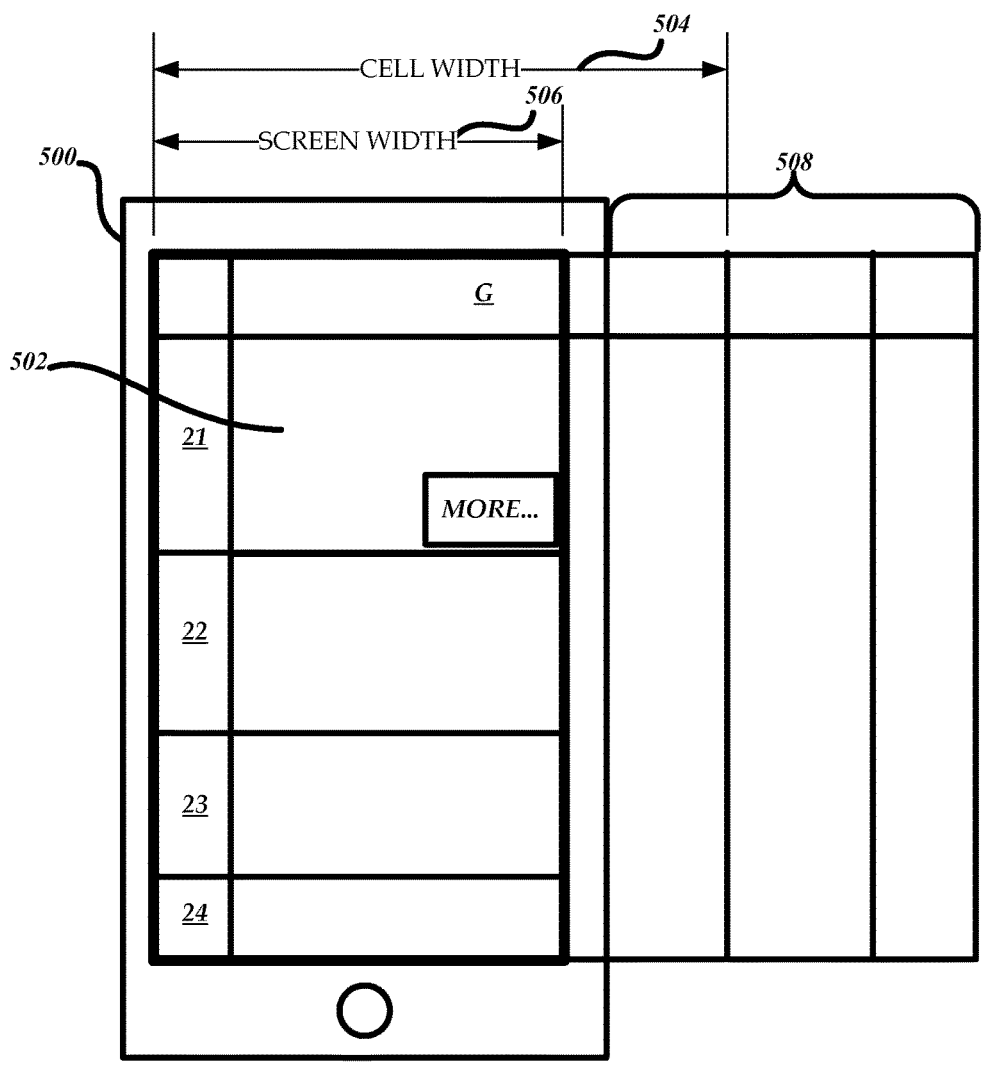
FIG. 5 depicts an exemplary device display interface displaying cells of a spreadsheet.

FIG. 5 depicts an exemplary device display interface 500 displaying cells of a spreadsheet, such as a smartphone or tablet screen. For example, a smartphone can use a spreadsheet application to display the cells for user interaction therewith. While a uniform distribution of cells is shown for this example, it will be appreciated that the cell layout can include irregular cell distributions such that a cell of one row differs in size from a cell of an adjacent row of the same column.

As shown in FIG. 5, a device user has selected cell 502 which includes a corresponding cell width dimension 504. For this example, the device display interface 500 has a screen width dimension 506 that is less than the cell width dimension 504. As such, the cell view mode algorithm is configured to provide a determination or evaluation output to trigger display of an associated cell view launch indicator (see FIGS. 4A and 4B for example). As described above, the cell view mode algorithm can use other cell and display dimensions or parameters to provide an output, such a height, area, and other aspects. FIG. 5 also depicts a remaining portion 508 of the spreadsheet not being displayed due in part to display constraints and/or current view settings. FIG. 5 illustrates a case where, even at lowest end of comfortable text viewing size setting, a particular cell might not be readable without horizontal panning by the user.

Figure 6:
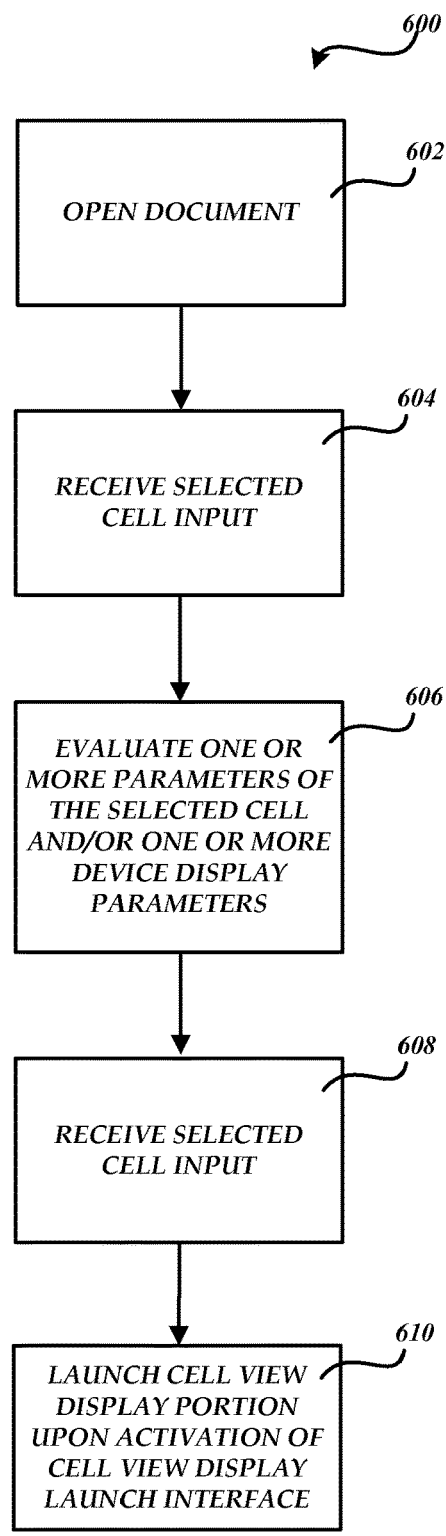
FIG. 6 is a flow diagram depicting an exemplary process of providing spreadsheet viewing and/or interaction features and functionality adapted for a portable computing/communication device.

FIG. 6 is a flow diagram depicting an exemplary process 600 of providing spreadsheet viewing and/or interaction features and functionality adapted for a portable computing/communication device, but is not so limited. In an embodiment, the process 600 can be implemented using complex programming instructions encoded as part of a computer-readable medium in part to provide a cell view mode algorithm for use in enabling a user to view a persistent cell view mode in conjunction with a spreadsheet view using a portable computing/communication device.

The process 600 of an embodiment begins at 602 when a user opens a spreadsheet document using the portable computing/communication device to view and interact with cells of the spreadsheet document. For example, a user can use a tablet or slate computer having a spreadsheet application to populate and view portions of the spreadsheet document. According to a particular portable electronic device in use, a user can use a variety of input modalities to interact with aspects of a displayed spreadsheet document (e.g., vocal, mouse, pen/stylus, touchscreen, keys, etc.).

At 604, the process 600 of an embodiment operates to receive a selected cell input when a user affirmatively selects a cell of the spreadsheet document. The selected cell input is used in part as a basis to provide a cell view display launch interface or indicator. The cell view display launch interface can be triggered and displayed using a cell view mode algorithm encoded as part of the spreadsheet application functionality. At 606, the process 600 of an embodiment operates to evaluate one or more parameters of the selected cell at the current zoom level along with one or more static and/or dynamic device display parameters as part of determining whether to use the cell view mode algorithm.

The cell view mode algorithm of an embodiment operates to trigger the display of the cell view display launch interface using a clipped or hidden text analysis and/or a comparison of a selected cell parameter, such as a cell dimension, to a display parameter, such as a viewable screen dimension. For example, the cell view mode algorithm can be used to trigger the cell view display launch interface if content of a selected cell has been clipped or otherwise occluded and/or based in part on a comparison between one or more parameters of a selected cell and one or more parameters of a device display. In an embodiment, the cell view mode algorithm is not triggered for empty cells. That is, the cell view display launch interface will not be triggered and displayed when empty cells are selected for such an embodiment.

The cell view mode algorithm can use information provided by an operating system or other component as part of a dimensional comparison or other comparison or determination operation. As such, the cell view mode algorithm can be configured to account for current view settings/operations including zoom and/or pan settings/operations. At 608, if the selected cell is not empty and cell view mode algorithm determines that the cell view display launch interface should be displayed, the cell view display launch interface is displayed as part of the selected cell or as a floating or other indicator associated with the currently selected cell.

At 610, upon actuation of the cell view display launch interface (e.g., by tapping, clicking, etc.) the process 600 operates to display a cell view display portion that encompasses a portion of the device display to display scrollable content of the selected cell in conjunction with a spreadsheet view in the remaining portion or some portion thereof, of the device display. The process 600 at 610 of one embodiment operates, upon actuation of the cell view display launch interface, to provide the cell view display portion as a persistent window adjacently disposed below the spreadsheet view.

The cell view display portion can be configured to be independently controllable so that a user can scroll about displayed content without affecting the layout of the spreadsheet view. In one embodiment, the cell view display portion can be configured to surface temporarily as a user hovers over the cell view display launch interface of an associated selected cell. The user can exit and remove the cell view display portion by pressing a back button or the like. While a certain number and order of operations is described for the exemplary flow of FIG. 6, it will be appreciated that other numbers and/or orders can be used according to desired implementations.

It will be appreciated that various features can be implemented as part of a processor-driven computer environment including hardware and software components. Also, while certain embodiments and examples are described above for illustrative purposes, other embodiments are included and available, and the described embodiments should not be used to limit the claims. Suitable programming means include any means for directing a computer system or device to execute steps of a method, including, for example, systems comprised of processing units and arithmetic-logic circuits coupled to computer memory, which systems have the capability of storing in computer memory, which computer memory includes electronic circuits configured to store data and program instructions. An exemplary computer program product is useable with any suitable data processing system. While a certain number and types of components are described above, it will be appreciated that other numbers and/or types and/or configurations can be included according to various embodiments. Accordingly, component functionality can be further divided and/or combined with other component functionalities according to desired implementations.

The term computer readable media or medium as used herein can include computer storage media and mediums. Computer storage media can include volatile and nonvolatile, removable and non-removable media implemented in any method or technology for storage of information, such as computer readable instructions, data structures, program modules, etc. System memory, removable storage, and non-removable storage are all computer storage media examples (i.e., memory or computer storage.). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computing device. Any such computer storage media may be part of a device or system. By way of example, and not limitation, communication media may include wired media such as a wired network or direct-wired connection, and wireless media such as acoustic, RF, infrared, and other wireless media.

The embodiments and examples described herein are not intended to be limiting and other embodiments are available. Moreover, the components described above can be implemented as part of networked, distributed, and/or other computer-implemented environment. The components can communicate via a wired, wireless, and/or a combination of communication networks. Network components and/or couplings between components of can include any of a type, number, and/or combination of networks and the corresponding network components which include, but are not limited to, wide area networks (WANs), local area networks (LANs), metropolitan area networks (MANs), proprietary networks, backend networks, cellular networks, etc.

Client computing devices/systems and servers can be any type and/or combination of processor-based devices or systems. Additionally, server functionality can include many components and include other servers. Components of the computing environments described in the singular tense may include multiple instances of such components. While certain embodiments include software implementations, they are not so limited and encompass hardware, or mixed hardware/software solutions.

Terms used in the description, such as component, module, system, device, network, and other terminology, generally describe a computer-related operational environment that includes hardware, software, firmware and/or other items. A component can use processes using a processor, executable, and/or other code. Computer resources can include processor and memory resources such as: digital signal processors, microprocessors, multi-core processors, etc. and memory components such as magnetic, optical, and/or other storage devices, smart memory, flash memory, etc. Communication components can be used to communicate computer-readable information as part of transmitting, receiving, and/or rendering electronic communication items using a communication network or networks, such as the Internet for example. Other embodiments and configurations are included.

Figure 7:
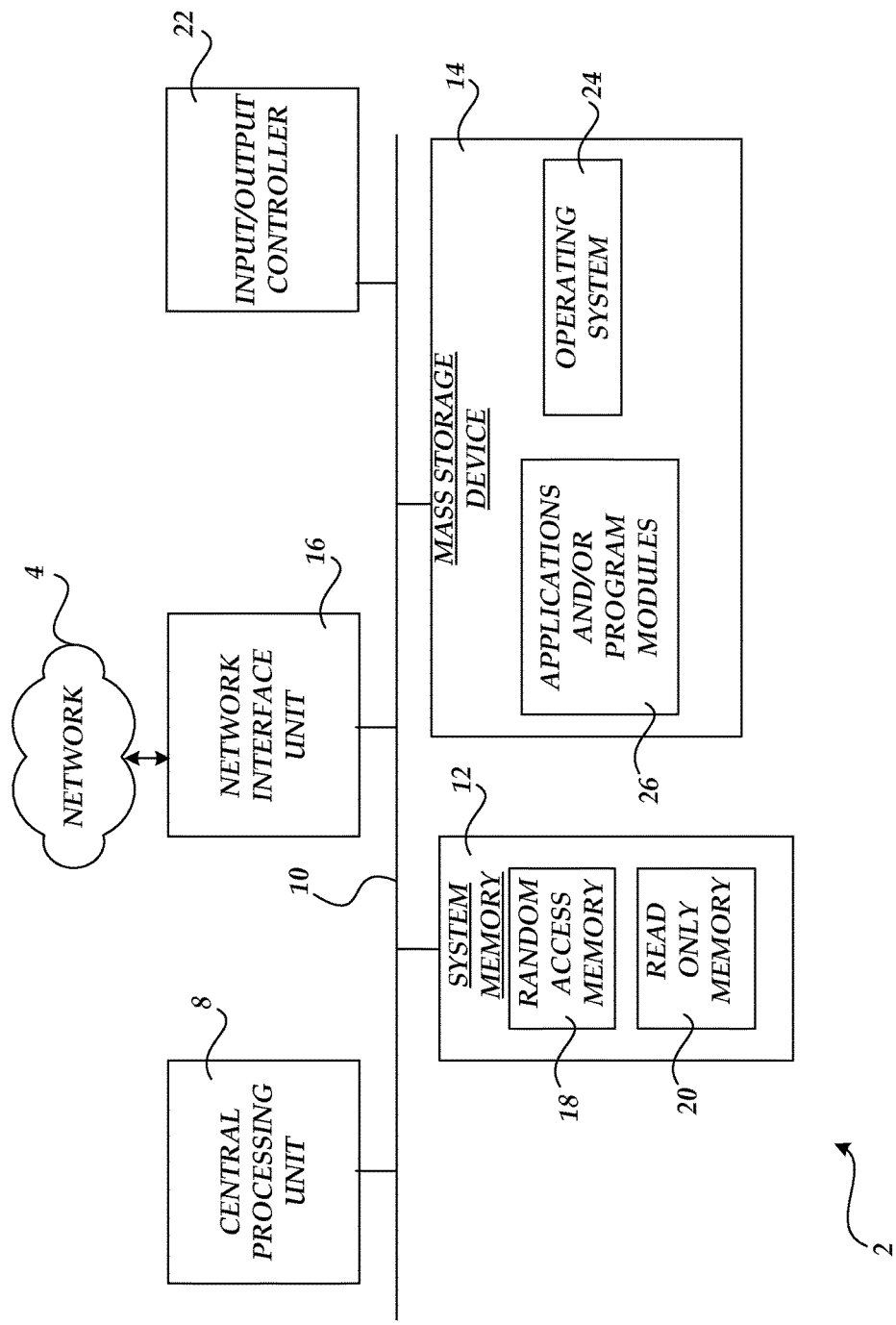
FIG. 7 is a block diagram illustrating an exemplary computing environment for implementation of various embodiments described herein.

FIG. 7 is used to provide a brief, general description of a suitable computing environment in which embodiments may be implemented. While embodiments can be described in the general context of program modules that execute in conjunction with program modules that run on an operating system on a personal computer, those skilled in the art will recognize that embodiments may also be implemented in combination with other types of computer systems and program modules.

Generally, program modules include routines, programs, components, data structures, and other types of structures that perform particular tasks or implement particular abstract data types. Moreover, those skilled in the art will appreciate that the embodiments may be practiced with other computer system configurations, including handheld devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Referring now to FIG. 7, an illustrative operating environment for embodiments will be described. As shown in FIG. 7, computer 2 comprises a general purpose server, desktop, laptop, handheld, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 24, application programs, and other applications/program modules/resources 26.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of other devices, including a keyboard, mouse, etc. (not shown). Similarly, an input/output controller 22 may provide output to a display screen, a printer, or other type of output device.

As mentioned briefly above, a number of program modules and data files may be stored in the mass storage device 14 and RAM 18 of the computer 2, including an operating system 24 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store application programs, such as word processing, spreadsheet, drawing, e-mail, and other applications and/or program modules, etc.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method comprising:
   determining that a cell in a spreadsheet includes hidden data;
   based on the determination, displaying a cell view launch indicator within the cell;
   receiving a selection of the cell view launch indicator;
   in response to receiving the selection, displaying in a separate window the hidden data of the cell.

2. The method of claim 1, further comprising determining if a cell dimension is greater than a display dimension, and displaying the cell view launch indicator based on the determination that the cell dimension is greater than the display dimension.

3. The method of claim 2, wherein the cell dimension is a horizontal dimension of the cell and the display dimension is a horizontal dimension of a display screen.

4. The method of claim 2, wherein the cell dimension is a vertical dimension of the cell and the display dimension is a vertical dimension of a display screen.

5. The method of claim 1, wherein the separate window is at least part of a cell view display portion.

6. The method of claim 1, wherein the cell view launch indicator is displayed upon receiving a selection of the cell and removed from display upon selection of another cell.

7. The method of claim 1, wherein the separate window is docked.

8. The method of claim 1, wherein the separate window is scrollable.

9. The method of claim 1, wherein the method of claim 1 is performed by a mobile device.

10. A system comprising:
    at least one processor; and
    memory storing instructions that when executed by the at least one processor perform a set of operations comprising:
       determining that a cell in a spreadsheet includes hidden data;
       based on the determination, displaying a cell view launch indicator within the cell;
       receiving a selection of the cell view launch indicator;
       in response to receiving the selection, displaying in a distinct display portion the hidden data of the cell.

11. The system of claim 10, wherein the operations further comprise determining if a cell dimension is greater than a display dimension, and displaying the cell view launch indicator based on the determination that the cell dimension is greater than the display dimension.

12. The system of claim 11, wherein the cell dimension is a horizontal dimension of the cell and the display dimension is a horizontal dimension of a display screen.

13. The system of claim 11, wherein the cell dimension is a vertical dimension of the cell and the display dimension is a vertical dimension of a display screen.

14. The system of claim 10, wherein the cell view launch indicator is displayed upon receiving a selection of the cell and the operations further comprise removing the cell view launch indicator from display upon selection of another cell.

15. The system of claim 10, wherein the system is at least part of a mobile device.

16. A method for displaying cell contents within a spreadsheet application on a mobile device having a display screen, comprising:
    determining that a cell in a spreadsheet includes hidden data based on at least one of: clipped text or a cell dimension being greater than a screen dimension;
    based on the determination, displaying a cell view launch indicator within the cell;
    receiving a selection of the cell view launch indicator;
    in response to receiving the selection, displaying the hidden data of the cell in a distinct display portion.

17. The method of claim 16, wherein the cell dimension is a horizontal dimension of the cell and the screen dimension is a horizontal dimension of the display screen.

18. The method of claim 16, wherein the cell dimension is a vertical dimension of the cell and the screen dimension is a vertical dimension of the display screen.

19. The method of claim 16, wherein the cell view launch indicator is displayed upon receiving a selection of the cell and removed from display upon selection of another cell.

20. The method of claim 16, wherein the distinct display portion is scrollable.

* * * * *